US005550598A

United States Patent [19]
Itoh et al.

[11] Patent Number: 5,550,598
[45] Date of Patent: Aug. 27, 1996

[54] CONVERGENCE ADJUSTMENT CIRCUIT AND PROJECTION TYPE DISPLAY APPARATUS

[75] Inventors: Masateru Itoh; Hiroshi Kawamura, both of Nagaokakyo, Japan

[73] Assignee: Mitsubishi Denki Kabushiki Kaisha, Tokyo, Japan

[21] Appl. No.: 341,182

[22] Filed: Nov. 18, 1994

[30]     Foreign Application Priority Data

Dec. 2, 1993 [JP] Japan .................................. 5-302698

[51] Int. Cl.⁶ .................................................. H04N 9/28
[52] U.S. Cl. ..................... 348/807; 315/368.11
[58] Field of Search ........................... 348/806, 807, 348/184, 190, 189; 315/368.11, 368.18, 368.19, 368.24; H09N 9/28

[56]             References Cited

U.S. PATENT DOCUMENTS 4,499,457  2/1985  Hintze ..................... 348/807
5,016,095  5/1991  Kii ............................. 348/807

FOREIGN PATENT DOCUMENTS

| 56-169983 | 12/1981 | Japan . | |
| 0078293 | 4/1986 | Japan | H04N 9/28 |
| 0199593 | 8/1988 | Japan | H04N 9/28 |
| 514912 | 1/1993 | Japan . | |

Primary Examiner—Victor R. Kostak

[57]              ABSTRACT

A convergence adjustment circuit and a projection type display apparatus provided with convergence adjustment circuit, including a fixed gain adjustment circuit which controls the waveform and level of an analog signal, wherein the analog signal is adjusted roughly in the fixed gain adjustment circuit and (the analog signal is adjusted) finely in the digital adjustment circuit thereby reducing the effect of the temperature characteristics and resolution the effect of the temperature characteristics and resolution and making it possible to carry out adjustment of convergence with high accuracy. A geomagnetism sensor circuit may also be provided for sensing changes in geomagnetism and outputting a signal for adjusting convergence to cancel out the effects of geomagnetism.

21 Claims, 4 Drawing Sheets

CONVERGENCE ADJUSTMENT CIRCUIT AND PROJECTION TYPE DISPLAY APPARATUS

BACKGROUND OF THE INVENTION

1. Field of the Invention

The present invention relates to a convergence adjustment circuit to adjust the convergence in a projection type display apparatus and a projection type display apparatus such as a projection television set provided with the convergence adjustment circuit.

2. Description of Related Art

In a projection television set which enlarges and projects an image formed by three picture tubes (e.g., cathode ray tubes) for three primary colors, the picture tubes are generally directed toward the screen at different angles and therefore misalignment of the image of different colors occur on the screen. Superposition of the three primary colors, so-called convergence, is achieved by generating an analog signal for convergence adjustment having a waveform of sawtooth or parabola which is synchronized with a horizontal and vertical scanning, while regulating the shape and signal level of the waveform in a control circuit.

In a conventional convergence adjustment circuit in a projection television set, an analog signal for adjustment which is outputted from a convergence-adjusting analog signal generation circuit is connected to variable resistors and the convergence is controlled by adjusting the value of the variable resistors. The variable resistors are often used in common in projection type display apparatus of different size and/or model. So that they are manufactured with difference by adjusting the value of each variable resistor corresponding to the size and/or model of the television set. Repairing the projection television set often requires adjustment of the value of the variable resistors. While it is necessary to install the variable resistors in an easily accessible place in order to facilitate such adjustment works, a recent projection television set has many as 40 variable resistors at the least, which make the layout of components in the television set very difficult. Since analog adjustment is not necessary adequate in terms of accuracy.

To eliminate the variable resistors, various convergence adjustment circuits employing digital convergence circuits were proposed as disclosed in the Japanese Patent Application Laid-Open No. 56-169983 (1981), the Japanese Patent Application Laid-Open No. 5-14912 (1993), and so on. These digital convergence circuits are not commercially practical because the convergence adjustment signal generator circuit and the circuit to control the output thereof are all made of digital elements and therefore components such as an A/D converter, memory and so forth cost more to be manufactured.

With the background described above, a hybrid convergence adjustment circuit combining analog and digital circuits which is expected to become dominant in the future will be described below.

FIG. 1 is a block diagram illustrative of a conventional hybrid convergence adjustment circuit combing analog and digital circuits. In FIG. 1, numeral 1 denotes a microcomputer which supplies control signals to a display signal generator circuit 2, a signal processor circuit 3 and digital adjustment circuits 5, 5. According to the control signal supplied from the microcomputer 1, the display signal generator circuit 2 supplies a character signal for the display of the number of channels, volume, setting function, and so on, to the signal processor circuit 3. The signal processor circuit 3 combines the character signal with video signals supplied from the outside, and supplies them to the picture tubes R, G, B which serve as display elements. The picture tube G, among the picture tubes R, G, B, is arranged at the center of the optical path of the projection system, and the picture tubes R, B are arranged on both sides of the picture tube G being inclined at specified angles to the optical path. The picture tubes R, G, B have deflection yokes R1, G1, B1, respectively, and the picture tubes R, B have auxiliary deflection yokes R2, B2, respectively, for the adjustment of convergence.

An analog signal convergence-adjusting generator circuit 4 constantly generates analog signals for convergence adjustment upon supply of power to the apparatus. The waveform and voltage level of the convergence adjustment analog signal is controlled by the digital adjustment circuit 5 according to the control signal supplied from the microcomputer 1. The signal controlled by the digital adjustment circuit 5 is sent to an amplifier 6 to be amplified, then sent to the auxiliary deflection yokes R2, B2 of the picture tubes R, B, respectively. The block diagram illustrates a representative constitution of a projection television set, and the circuits for the signals sent to the auxiliary deflection yokes R2 and B2 have an equivalent constitution.

In the convergence adjustment circuit of such a constitution as described above, the analog convergence adjustment signal is controlled by the digital adjustment circuit 5 in a digital process, for the adjustment of convergence according to the digital control signal supplied from the microcomputer 1.

In the conventional hybrid adjustment circuit combining analog and digital circuits, as it is constituted as described above, waveform and level of the analog signal for convergence is adjusted only in the digital adjustment circuit 5. In case the adjustment is carried out only in the digital adjustment circuit 5, there has been a problem that the accuracy of adjustment heavily depends on the temperature characteristic of the digital adjustment circuit 5 and also on the resolution of the digital adjustment circuit 5 itself.

SUMMARY OF THE INVENTION

The present invention has been made in order to solve the above problems. One object of the invention is to provide a convergence adjustment circuit capable of eliminating the problem of the temperature dependency and of resolution of the digital adjustment circuit and carrying out adjustment of convergence with a high accuracy by providing a fixed gain adjustment circuit which controls the waveform and level of the convergence adjustment analog signal, and to provide a projection type display apparatus equipped with the convergence adjustment circuit.

In the convergence adjustment circuit and the projection type display apparatus of the invention, rough adjustment of the analog signal is carried out in the fixed gain adjustment circuit and fine adjustment of the analog signal is carried out in the digital adjustment circuit. The fixed gain adjustment circuit is constituted of a matrix of resistors, for example, which has good temperature characteristics. The rough adjustment is carried out by fixing the gain to a specified level in the fixed gain adjustment circuit and fine adjustment that remains is carried out in the digital adjustment circuit, and therefore smaller range of the signal is subjected to the digital processing, resulting in improved overall accuracy of the control with the same level of the resolution of the digital adjustment circuit. Also the fixed gain adjustment circuit has better temperature characteristics than the digital adjustment circuit comprising active elements, and therefore provides better temperature characteristics during convergence adjustment as well. Thus the influences of the temperature characteristics and resolution of the digital adjustment circuit upon the accuracy of convergence adjustment can be greatly decreased. This makes it also possible to carry out the adjustment of convergence with high accuracy and to display images on the screen with less color misalignment.

Another object of the invention is to provide a convergence adjustment circuit capable of carrying out convergence adjustment with high accuracy by means of a geomagnetism sensor to detect changes in the geomagnetism and a control means for outputting control signal to eliminate the effects of the geomagnetism, and to provide a projection type display apparatus equipped with the convergence adjustment circuit.

The convergence adjustment circuit and the projection type display apparatus described above further comprises the control means for detecting an output signal from the geomagnetism sensor circuit and accordingly outputting a digital control signal to eliminate the effects of the geomagnetism. This enables it to reduce the effects of the geomagnetism greatly which would otherwise affect the operation of the digital adjustment circuit. Therefore the effects of the geomagnetism on the operation of scanning of the electron beam can be greatly reduced, thereby further improving the accuracy of convergence adjustment.

Further, by making the control means in such a constitution as the digital control signal is refreshed at specified intervals, destroyed data can be restored so that the operation is less affected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The invention will now be described in detail below with reference to the drawings illustrative of the preferred embodiments.

Figure 1:
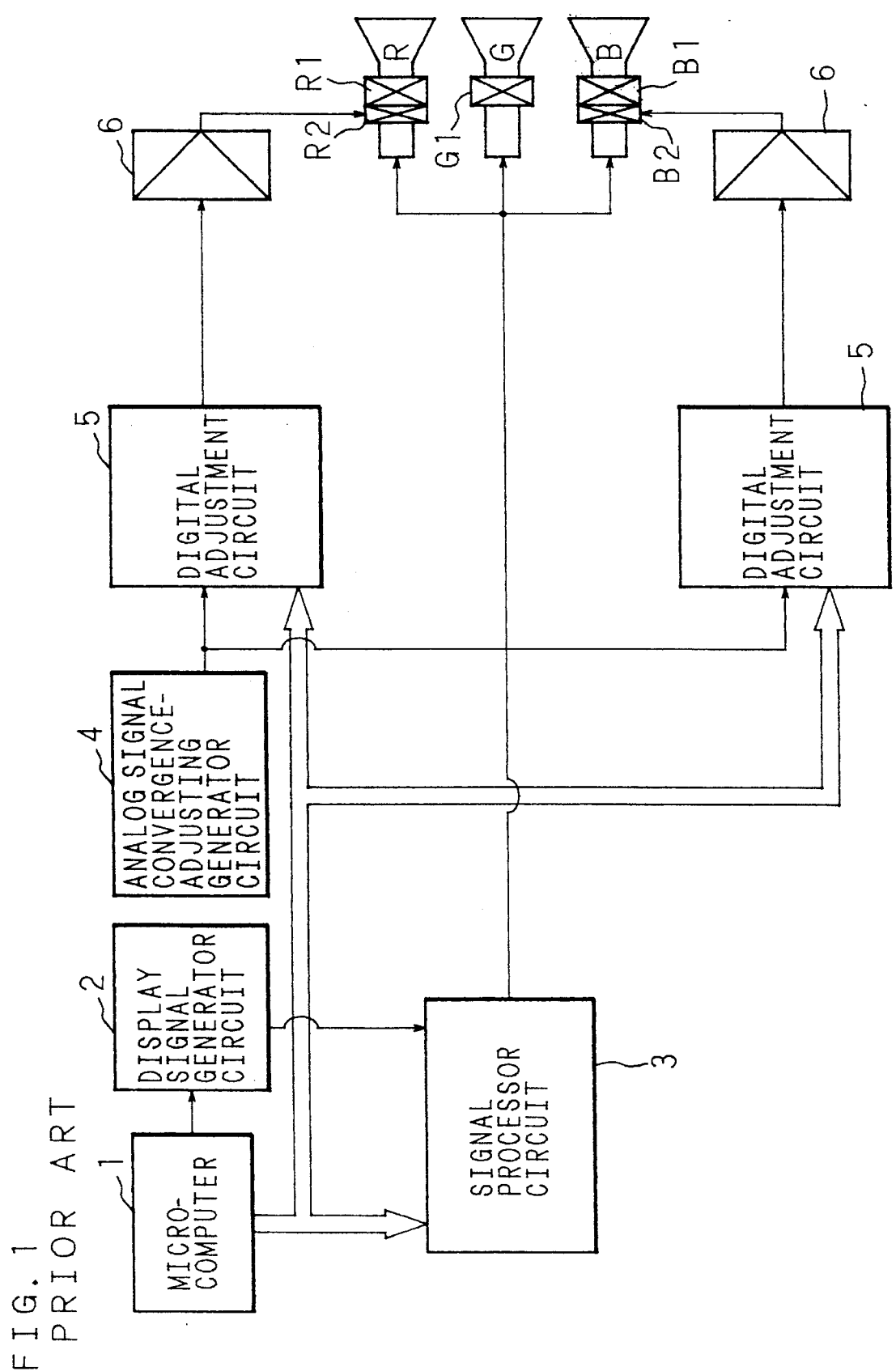
FIG. 1 is a block diagram illustrative of the constitution of a conventional convergence adjustment circuit.
Figure 2:
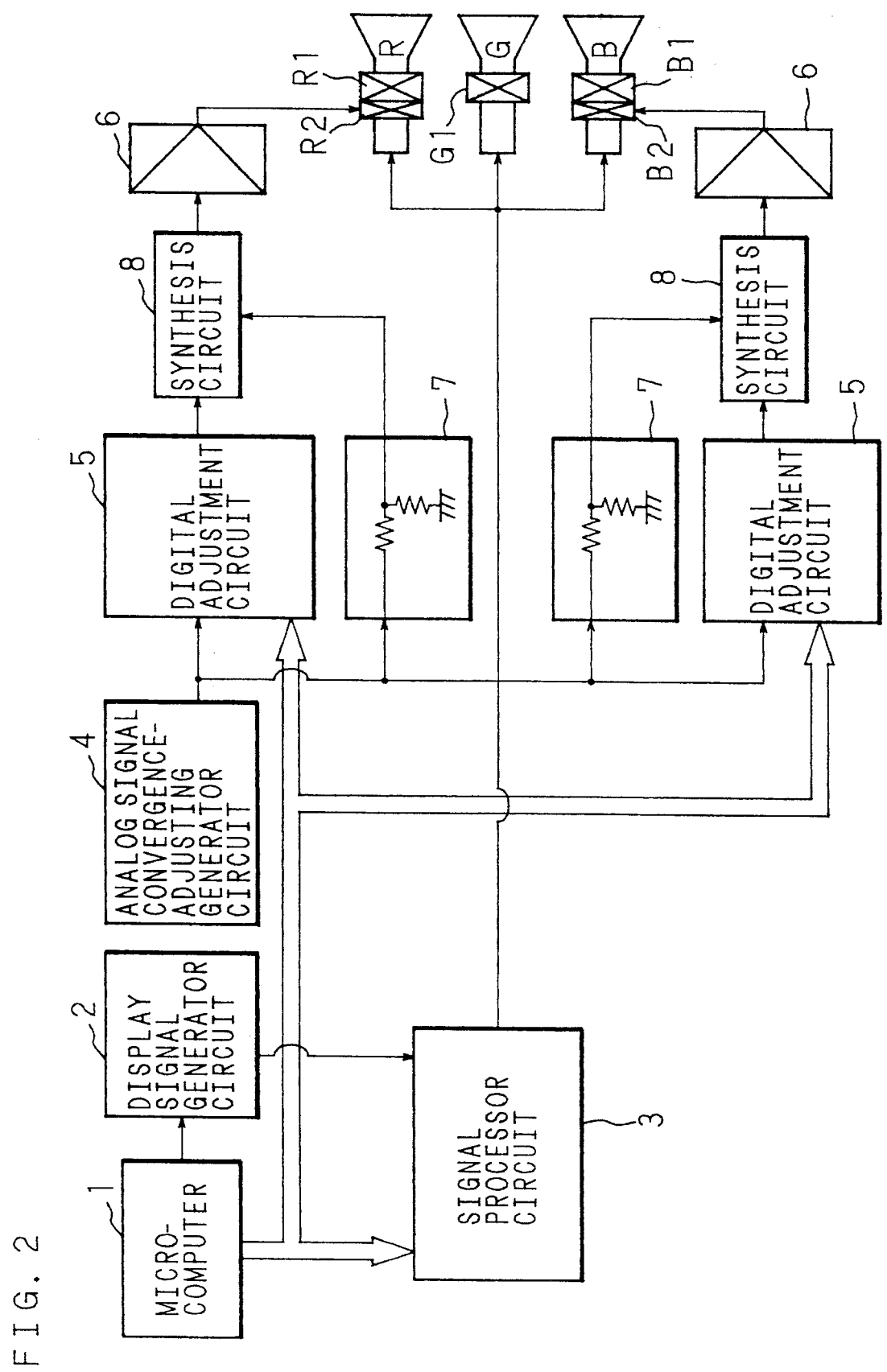
FIG. 2 is a block circuit diagram illustrative of a main portion of the projection type display apparatus of the invention.

FIG. 2 is a block circuit diagram illustrative of a main portion of the projection type display apparatus of the invention. In FIG. 2, an arrow indicates an analog signal and a hollow arrow indicates a digital signal. In FIG. 2, numeral 1 denotes a microcomputer which supplies control signals to display signal generator circuit 2, a signal processor circuit 3 and digital adjustment circuits 5, 5. The display signal generator circuit 2 supplies the signal processor circuit 3 with a character signal to display the number of a channel, volume, setting function and so on. according to the output signal from the microcomputer 1. The signal processor circuit 3 combines the character signal and a video signal supplied from a predetermined device, and supplies them to the picture tubes R, G, B which serve as display elements. The picture tubes R, G, B have deflection yokes R1, G1, B1, respectively, and the picture tubes R, B which are inclined at specified angles from the central optical path of the projection system have auxiliary deflection yokes R2, B2, respectively, for the adjustment of convergence.

When power is supplied to the projection type display apparatus, the convergence-adjusting analog signal generator circuit 4 constantly generates analog signals for convergence adjustment, of parabolic waveform for example, to the digital adjustment circuit 5 and to a fixed gain adjustment circuit 7 which comprises a resistor matrix made by connecting resistors in a matrix which are passive elements. After being processed in these circuits, the signals are synthesized in a synthesis circuit 8.

The fixed gain adjustment circuit 7 in this embodiment is made by connecting two resistors in series with one end thereof connected to the convergence-adjusting analog signal generator circuit 4 and another end grounded, while the junction of the two resistors is connected to the synthesis circuit 8 as shown in FIG.2. Peak value, time axis value and other kinds of value of the convergence adjustment analog signal are roughly adjusted in tile fixed gain circuit 7 to a level determined by the fixed gain, and finely adjusted by the digital adjustment circuit 5 according to the control signal supplied from the microcomputer 1. The control signal From the microcomputer 1 is refreshed at specified intervals, and therefore the control signal is not affected easily when data is destroyed.

The signal synthesized in the synthesis circuit 8 is supplied to the amplifier 6. The amplifier 6 amplifies this signal and supplies it to the auxiliary deflection yokes R2, B2 of the picture tubes R, B, respectively, for the adjustment of convergence.

Now the operation will be described below.

Figure 3:
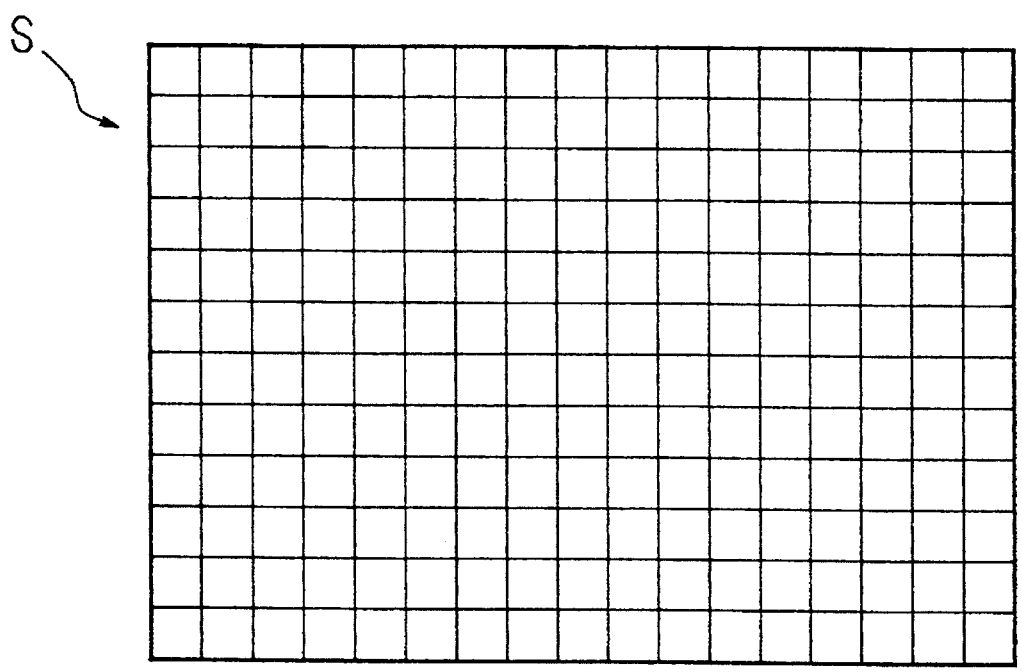
FIG. 3 is a schematic diagram illustrative of a convergence adjustment pattern.

FIG. 3 is a schematic diagram illustrative of a convergence adjustment pattern. The projection type display apparatus shown in FIG. 2 is provided with an input device having an input means for start of adjustment, end of adjustment, color designation, direction of adjustment and distance of adjustment, in order for the microcomputer 1 to output the control signal. When carrying out the convergence adjustment, the input device is operated in a specified manner to make the microcomputer 1 output the control signal to the display signal generator circuit 2 thereby generating a test signal so that, for example, a grid pattern comprising 16 columns in the horizontal direction and 11 rows in the vertical direction is displayed on the screen S as indicated by black lines in FIG.3. When no color misalignment exists, light beams of the three primary colors coincide with each other and therefore the grid pattern is displayed in white.

When color misalignment exists, the input device gives a direction, for example, to shift the red image 1 mm to the right in the top right portion of the screen S. The information given by means of the input device is converted to a specified control signal in the microcomputer 1 and is fed to the digital adjustment circuit 5 which is connected to the picture tube R. According to the control signal, the digital adjustment circuit 5 adjusts the output signal from the convergence-adjusting analog signal generator circuit 4. Because the signal has already been roughly adjusted in the fixed gain adjustment circuit 7, amount of adjustment which must be done by the digital adjustment circuit 5 is less than that in the case of the prior art, making it possible to carry out the adjustment in a shorter period of time. Also by employing the resistor matrix comprising resistor elements having good temperature characteristic, effect of the temperature change can be greatly decreased.

By employing such a constitution that a remote controller is used for the input device and input is made by means of the hidden command, this operation can be made accessible only to service personnel and not open to ordinary users.

The convergence adjustment circuit of the invention may be made, instead of the constitution of manual operation, in such a constitution that is provided with elements including a sensor to detect color in the grid pattern while convergence adjustment is carried out automatically so that the color detected by the sensor becomes the desired color, e.g., white.

Although the resistor matrix is used for the fixed gain adjustment circuit in this embodiment, an analog element such as fixed amplifier having good temperature characteristics may also be used. Also the circuit constitution of the resistor matrix is not limited to that illustrated in FIG. 2.

Figure 4:
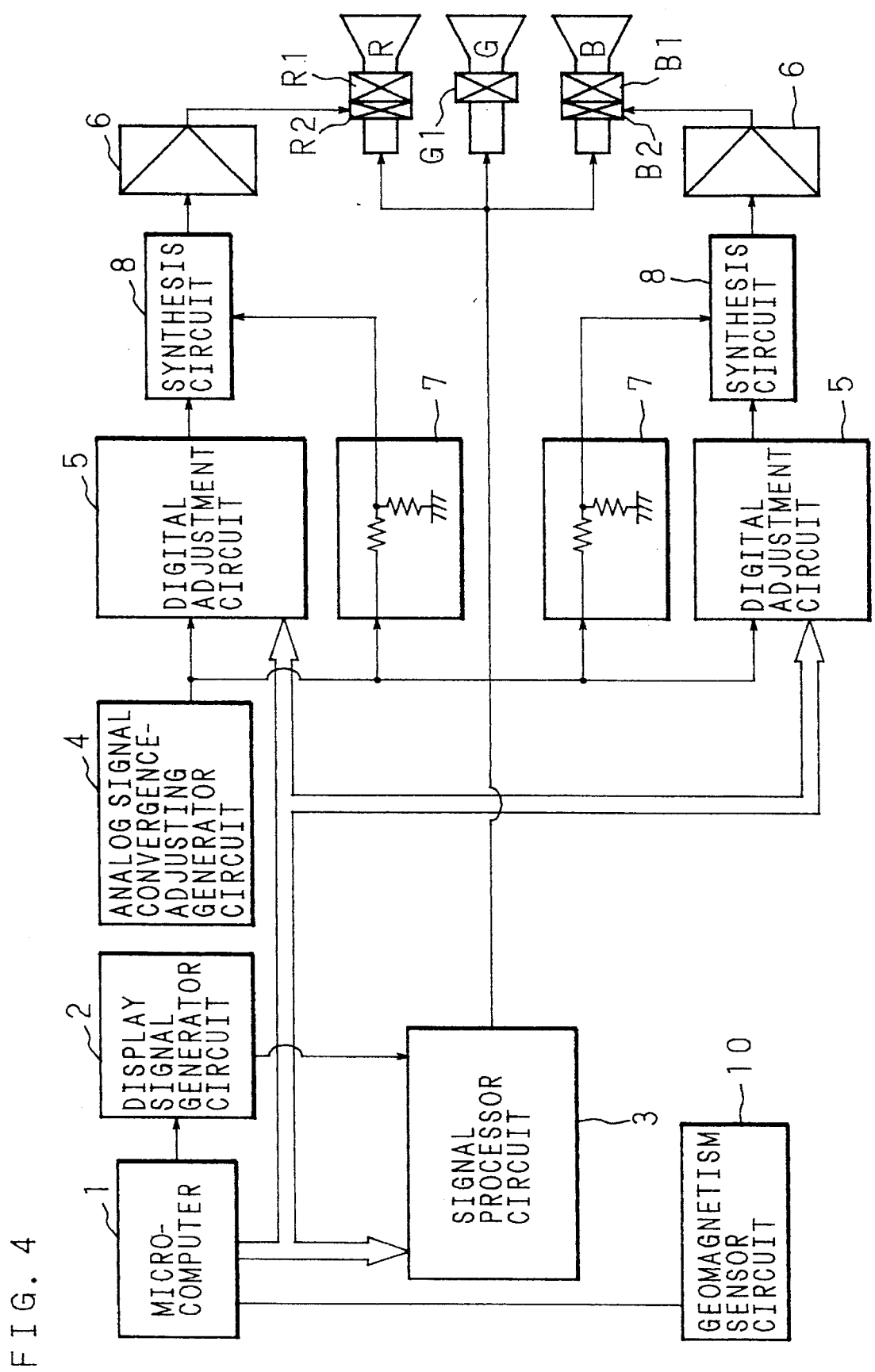
FIG. 4 is a block circuit diagram illustrative of a main portion in another embodiment of the projection type display apparatus of the invention.

FIG. 4 is a block circuit diagram illustrative of a portion in another embodiment of the projection type display apparatus of the invention. Constitution of this embodiment is provided with the geomagnetism sensor circuit 10 which converts the intensity of the geomagnetism into a signal of DC voltage and outputs the signal to the microcomputer 1. According to this signal, the microcomputer 1 outputs a control signal to control the output signal from the convergence-adjusting analog signal generator circuit 4 in the digital adjustment circuit 5. Rest of the constitution is similar to that shown in FIG. 2, and corresponding components are denoted by the same numerals, with description thereof being omitted.

The output signal from the geomagnetism sensor circuit 10 which converts a change in the geomagnetism to a change in DC voltage is input to the microcomputer 1 via a converter provided in the microcomputer 1. The microcomputer 1 recognizes the change and outputs a control signal to the digital adjustment circuit 5 which controls the output gain of the convergence-adjusting analog signal generator circuit 4 by means of a digital signal, so that a drift of the convergence in the projection television due to the geomagnetism is canceled out.

In this embodiment, effect of the geomagnetism can be greatly reduced in addition to the effects of other embodiments described above, and consequently the accuracy of adjusting the convergence is further improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A convergence adjustment circuit, comprising:
   an analog signal convergence adjusting generator circuit generating an analog convergence adjustment signal;
   an analog fixed gain adjustment circuit roughly adjusting a waveform and level of said analog convergence adjustment signal by a fixed gain adjustment value;
   a digital adjustment circuit finely adjusting the waveform and level of said analog convergence adjustment signal according to a digital control signal;
   a control means for outputting said digital control signal; and
   a synthesis circuit synthesizing the roughly adjusted convergence adjustment signal from said analog fixed gain adjustment circuit and the finely adjusted convergence adjustment signal from said digital adjustment circuit.

2. The convergence adjustment circuit according to claim 1, wherein
   said fixed gain adjustment circuit consists of a resistor matrix.

3. The convergence adjustment circuit according to claim 1, further comprising a geomagnetism sensor circuit which outputs a signal representing intensity of geomagnetism,
   wherein said control means outputs a digital control signal which substantially cancels out the effect of the geomagnetism according to the output signal of said geomagnetism sensor circuit.

4. The convergence adjustment circuit according to claim 1, wherein
   said control means refreshes the digital control signal at specified intervals.

5. The convergence adjustment circuit according to claim 1, wherein said analog fixed gain adjustment circuit includes an analog amplifier.

6. The convergence adjustment circuit according to claim 1, and further comprising: a manual input means for inputting manual convergence adjustment signals wherein said control means receives the manual convergence adjustment signals and outputs the digital control signal wherein the digital control signal is dependent upon the manual convergence adjustment signals.

7. The convergence adjustment circuit according to claim 1, wherein said manual input means is remote from the convergence adjustment circuit.

8. A projection type display apparatus, comprising:
   picture tubes to form an image;
   auxiliary deflection yokes provided on said picture tubes for convergence adjustment;
   an analog convergence adjusting signal generator circuit which generates analog convergence adjustment signals;
   an analog fixed gain adjustment circuit roughly adjusting the waveform and level of said analog convergence adjustment signals;
   a digital adjustment circuit finely adjusting the waveform and level of said analog convergence adjustment signals according to a digital control signal;
   a control means for outputting said digital control signal; and
   a synthesis circuit synthesizing the roughly adjusted convergence adjustment signal from said analog fixed gain adjustment circuit and the finely adjusted convergence adjustment signal from said digital adjustment circuit;
   wherein the output signal from said synthesis circuit are provided to said auxiliary deflection yokes.

9. The projection type display apparatus according to claim 8, wherein said fixed gain adjustment circuit consists of a resistor matrix.

10. The projection type display apparatus according to claim 8, further comprising a geomagnetism sensor circuit which outposts a signal representing intensity of geomagnetism, wherein said control means outputs a digital control signal which substantially cancels out the effect of the geomagnetism according to the output signal of the geomagnetism sensor circuit.

11. The projection type display apparatus according to claim 8, wherein said control means refreshes the digital control signal at specified intervals.

12. The projection display apparatus of claim 5, wherein said analog fixed gain adjustment circuit includes an analog amplifier.

13. The projection display apparatus of claim 5, and further comprising: a manual input means for inputting manual convergence adjustment signals wherein said control means receives the manual convergence adjustment signals and outputs the digital control signal wherein the digital control signal is dependent upon the manual convergence adjustment signals.

14. The projection display apparatus of claim 5, wherein said manual input means is remote from the convergence adjustment circuit.

15. The projection display apparatus of claim 5, further comprising an automatic convergence adjustment means including a color sensor sensing convergence of a test pattern formed by said picture tubes.

16. A method for adjusting convergence of a display comprising the steps of:

generating an analog convergence adjustment signal, roughly adjusting a waveform and level of the analog convergence adjustment signal with an analog fixed gain adjustment value, finely adjusting a waveform and level of the analog convergence adjustment signal using digital adjustment, controlling the fine adjustment step, and synthesizing the roughly adjusted and finely adjusted analog convergence adjustment signals to provide a synthesized convergence adjustment signal.

17. The method of claim 16, further comprising the step of:

sensing a change in geomagnetism, wherein said controlling step controls said fine adjustment step to substantially cancel out the effect of geomagnetic changes sensed in said sensing step.

18. The method of claim 16, wherein said control step controls the said adjustment step at predetermined intervals.

19. The method of claim 16, and further comprising the steps of: inputting manual convergence adjustment signals wherein said controlling step controls said fine adjustment step according to said manual convergence adjustment signals.

20. The method of claim 16, and further comprising the steps of:

forming a convergence test pattern on a display, sensing a degree of convergence of the displayed convergence test pattern, and generating an automatic convergence adjustment signal.

21. The method of claim 16, and further comprising the step of:

adjusting convergence of a display according to the synthesized convergence adjustment signal.

* * * * *